United States Patent [19]

Kaneda et al.

[11] Patent Number: 5,184,282
[45] Date of Patent: Feb. 2, 1993

[54] IC CARD ADAPTER

[75] Inventors: Takashi Kaneda, Chiba, Japan; Thomas Villwock, Niedernhausen, Fed. Rep. of Germany

[73] Assignees: MIPS Co., Ltd., Tokyo, Japan; Dataline Technologies GmbH, Frankfurt-Niedernhausen, Fed. Rep. of Germany

[21] Appl. No.: 806,293

[22] Filed: Dec. 13, 1991

Related U.S. Application Data

[63] Continuation-in-part of Ser. No. 698,795, May 13, 1991, which is a continuation of Ser. No. 392,454, Aug. 11, 1989, Pat. No. 5,036,429.

[30] Foreign Application Priority Data

Feb. 27, 1989 [JP] Japan ................................ 1-20199

[51] Int. Cl.⁵ .............................................. H05K 1/14
[52] U.S. Cl. ...................................... 361/395; 235/495; 273/435; 361/392; 361/393; 361/394; 361/399; 439/61; 439/62; 439/68
[58] Field of Search ............... 235/379, 380, 492, 493, 235/495; 273/148 B, 435; 361/392, 393, 394, 395, 413, 415; 364/708; 439/68, 62, 74, 76, 638, 639, 52

[56] References Cited

U.S. PATENT DOCUMENTS

| 3,573,358 | 4/1971 | Babcock | 439/61 |
|---|---|---|---|
| 4,131,851 | 12/1978 | Martiny et al. | 361/395 |
| 4,285,063 | 8/1981 | Zbinden | 375/106 |
| 4,341,951 | 7/1982 | Benton | 235/379 |
| 4,392,701 | 7/1983 | Weidler | 439/638 |
| 4,401,351 | 8/1983 | Record | 361/395 |
| 4,516,777 | 5/1985 | Hikora | 273/148 B |
| 4,769,764 | 9/1988 | Levanon | 364/708 |
| 4,821,146 | 4/1989 | Behren et al. | 361/395 |
| 4,838,814 | 6/1989 | Takai et al. | 439/638 |
| 4,840,570 | 6/1989 | Mann, Jr. et al. | 361/413 |
| 4,862,327 | 8/1989 | Ansell et al. | 361/394 |
| 4,882,473 | 11/1989 | Bergeron et al. | 235/492 |
| 4,908,634 | 3/1990 | Chung et al. | 361/394 |

FOREIGN PATENT DOCUMENTS

| 0431723 | 6/1991 | European Pat. Off. | 273/435 |
|---|---|---|---|
| 3310821 | 9/1984 | Fed. Rep. of Germany | 361/415 |
| 3336817 | 4/1985 | Fed. Rep. of Germany | 361/395 |
| 0056088 | 2/1990 | Japan | 235/493 |
| WO88/00790 | 1/1988 | PCT Int'l Appl. | |
| 2139017 | 10/1984 | United Kingdom | 439/76 |
| 8200213 | 1/1982 | World Int. Prop. O. | 235/379 |

Primary Examiner—Leo P. Picard
Assistant Examiner—D. Sparks

[57] ABSTRACT

An IC card adapter is connectable to an electronic device such as a computer or printer. The adapter removably stores a plurality of IC cards which are connected to the electronic device through a connector portion. The adapter has a housing with three slots each having a card receptor portion. A first slot on the rear side of the housing is larger than the other two slots on opposed sides of the housing. This first slot and card receptor portion are located closer to the bottom of the housing than the other two slots and card receptor portions. Indicators and a phone connection device can also be provided on the housing and a printed circuit board with electronic mechanisms can be provided within the housing so that the adapter can operate without the IC cards.

30 Claims, 4 Drawing Sheets

IC CARD ADAPTER

This application is a Continuation-in-Part of Ser. No. 07/698,795 filed on May 13, 1991, which is a Continuation of application Ser. No. 07/392,454 filed on Aug. 11, 1989, now U.S. Pat. No. 5,036,429. The entire contents of both applications are hereby incorporated by reference.

BACKGROUND OF THE INVENTION

The present invention relates to an IC card adapter for use in selectively adding to an electronic device such as electronic computers or electronic printers at least a new function in an IC card.

There is a case where a function or functions which are not included originally in such electronic device are to be added thereto or a certain original function thereof is to be modified or replaced by another. In order to make it possible to respond to such a requirement, it is highly desired to provide an adapter capable of selectively incorporating a desired one of a plurality of IC cards each having integrated circuit devices such as CPU, ROM and/or RAM etc., and a desired program stored therein.

SUMMARY OF THE INVENTION

The present invention intends to provide an IC card adapter capable of removably incorporating, in an electronic device such as computers, word processors or printers, at least one IC card having its own program to thereby make it possible to operate the electronic device on a basis of the program which is not included originally in the electronic device.

According to the first embodiment of the present invention, an IC card adapter includes a housing, an IC card receptor portion provided in or on the housing for removably receiving a plurality of individual IC cards and a connector portion provided in the front portion of the housing and adapted to electrically and mechanically connect the IC card adapter to the electronic device.

According to a second embodiment of the present invention, an IC card adapter includes, in addition, means for selectively incorporating a desired one or more of the IC cards in the receptor portion thereof in the electronic device.

The means for selectively incorporating the desired IC card in the electronic device comprises means responsive to a control signal from the electronic device or from a manually operable switch circuit. In the latter case, an external selection of a desired IC card becomes possible.

It is possible to provide an indicator on the housing to indicate the IC card selection.

In a third embodiment of the present invention, the housing of the IC card adapter has three slots defined therein. Each of these slots have card receptor portions. The first slot is larger than and closer to the bottom of the housing than the second and third slots. The second and third slots are on opposed sides of the housing and are generally the same size such that IC cards can be readily exchanged between these two slots. The card receptor portions in these second and third slots are generally parallel to one another. The first side of the housing having the first slot is opposed to the front side of the housing having a connector portion for electrically and mechanically connecting the adapter to an electronic device. Indicators and a phone connector can be provided on this first side of the housing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
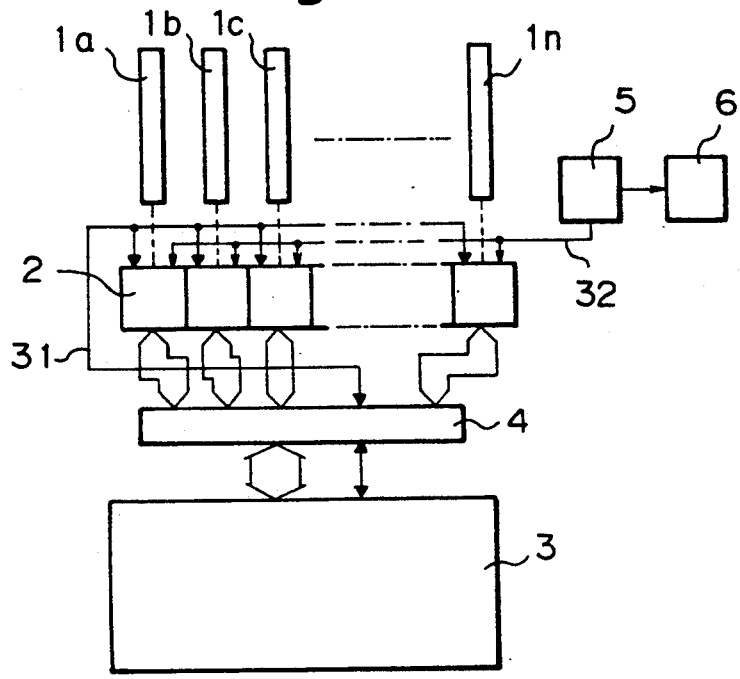
FIG. 1 shows schematically an arrangement of an IC card adapter according to the present invention with respect to an electronic device.
Figure 2:
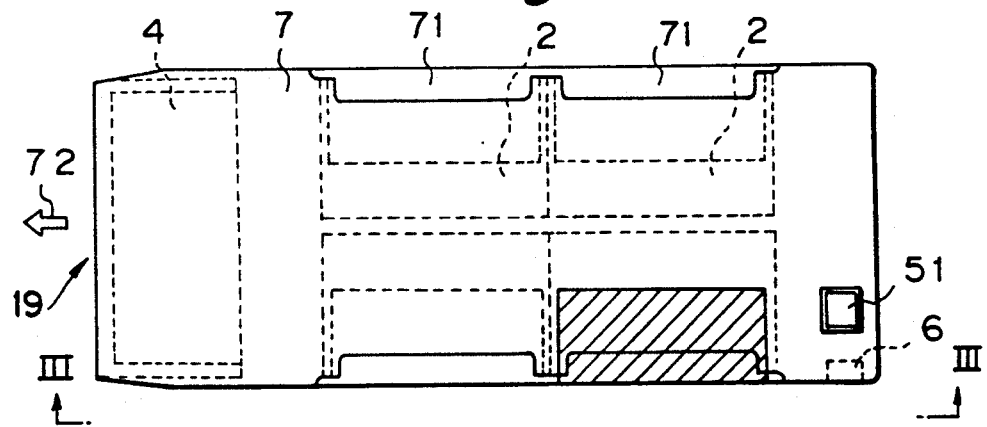
FIG. 2 is a plan view of a first embodiment of a lateral type IC card adapter of the present invention.
Figure 3:
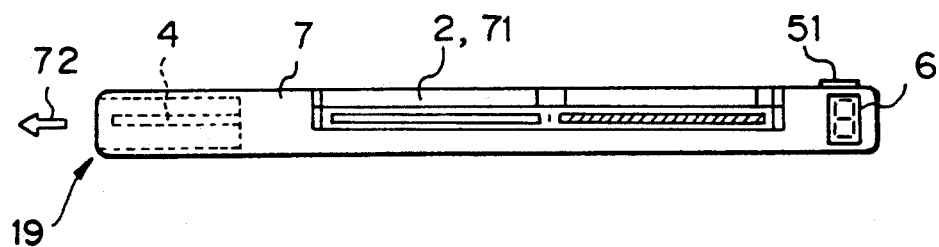
FIG. 3 is a side view of the IC card adapter taken along a line III—III in FIG. 2.

In FIGS. 1 to 3, an embodiment of an IC card adapter according to the present invention is shown. This embodiment comprises a housing 7 including a card receptor 2 of a lateral type for removably receiving a plurality of individual IC cards $1a, 1b, \ldots, 1n$ and a connector portion 4 for connecting electrically and mechanically the card receptor 2 to an electronic device 3 such as computers, word processors or electronic printers. The connector portion 4 may respond to a control signal 31 from the electronic device 3 which may be given according to a program incorporated therein to select a desired one or more of the IC cards $1a, 1b \ldots 1n$.

In order to allow an external selection of a desired one or more of the IC cards to be connected to the electronic device 3, a switch circuit 5 is provided in the housing 7. The switch circuit 5 is adapted to produce an external control signal 32 upon which an external IC card selection becomes possible. The switch circuit 5 includes a manual switch 51 and the external control signal is produced by manually operating the switch 51. An indicator 6 is associated with the switch circuit 5 to indicate a selected IC card.

In FIGS. 2 and 3, the housing 7 has a plurality of slots 71 in which the card receptor 2 is provided, respectively, to removably receive the individual IC card 1a, 1b ... or 1n, horizontally. In FIGS. 2 and 3, a hatched portion shows a slot 71 which has received a horizontally disposed IC card.

The manual switch 51 is provided in the rear corner of the housing 7. The connector portion 4 is formed in the front end portion 19 of the housing 7, which, when the adapter is moved in the arrow direction 72, fits electrically and mechanically in a connector portion (not shown) of the electronic device which is connected to electronic circuits of the electronic device for expanding function of the electronic device when it is an electronic computer, or for a font expansion/format setting function when it is a word processor.

The indicator 6 which may be a 7-segment LED is provided in a side surface of the housing, so that an IC card selected upon the control signal 31 from the electronic device 3 or from the manual switch 51 through the switch circuit 5 can be displayed suitably thereon.

Figure 4:
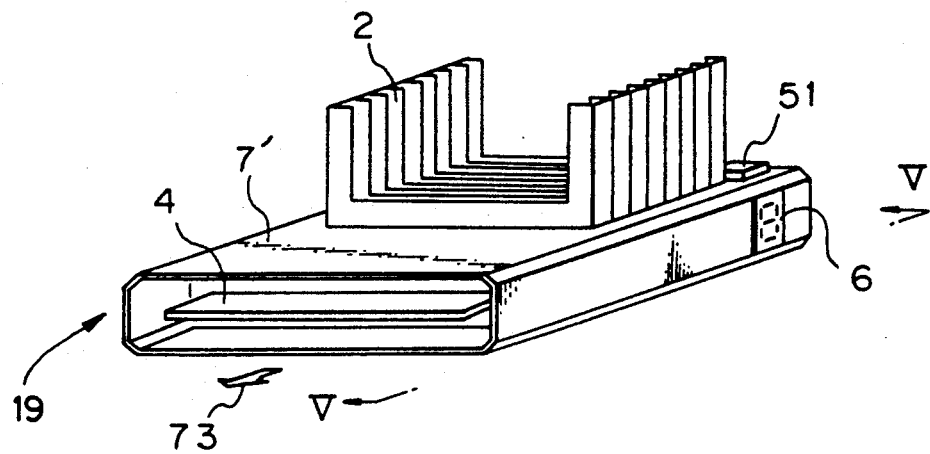
FIG. 4 is a perspective view of a second embodiment of a vertical type IC card adapter of the present invention.
Figure 5:
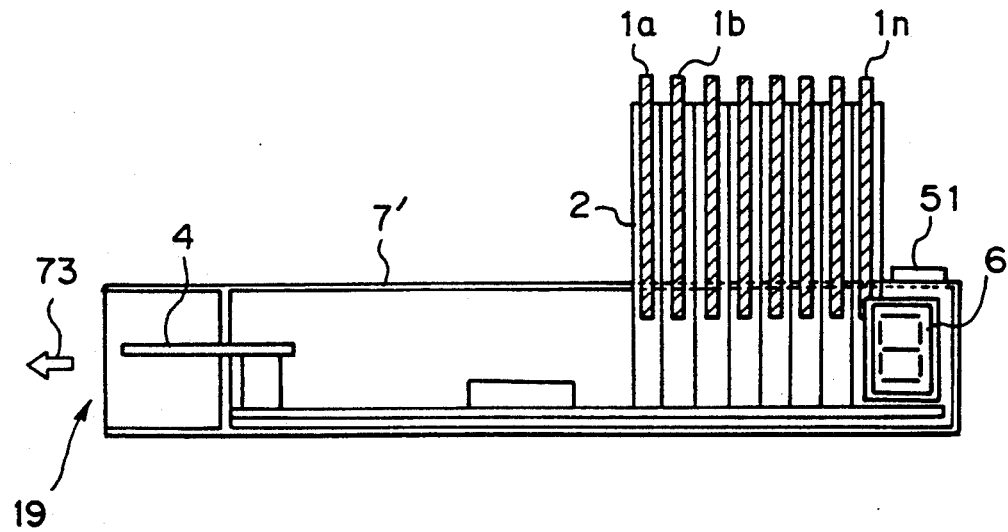
FIG. 5 is a cross section taken along line V—V in FIG. 4, with the IC card receptor filled with IC cards.

In FIGS. 4 and 5 which are a plan view and a side view of another embodiment of the present invention, respectively, vertical IC card receptors 2 are arranged side by side in which respective IC cards Ia, 1b ..., 1n are to be inserted vertically. A manual switch 51 and a display 6 are provided on the rear portion of the housing 7' similarly to the embodiment shown in FIGS. 1 and 3, and a connector portion 4 is also provided in the front portion 19 of the housing 7'. Functions of these elements are the same as those shown in FIGS. 2 and 3, respectively.

The IC card adapter is fitted in a connector portion (not shown) of the electronic device 3 by inserting it into the connector portion of the device as shown by the arrow 73. A selection of a desired IC card is performed by the control signal 31 to be supplied from the electronic device internally or by the signal 32 to be producing by operating the manual switch 51 as in the case of the embodiment shown in FIGS. 2 and 3.

Figure 6:
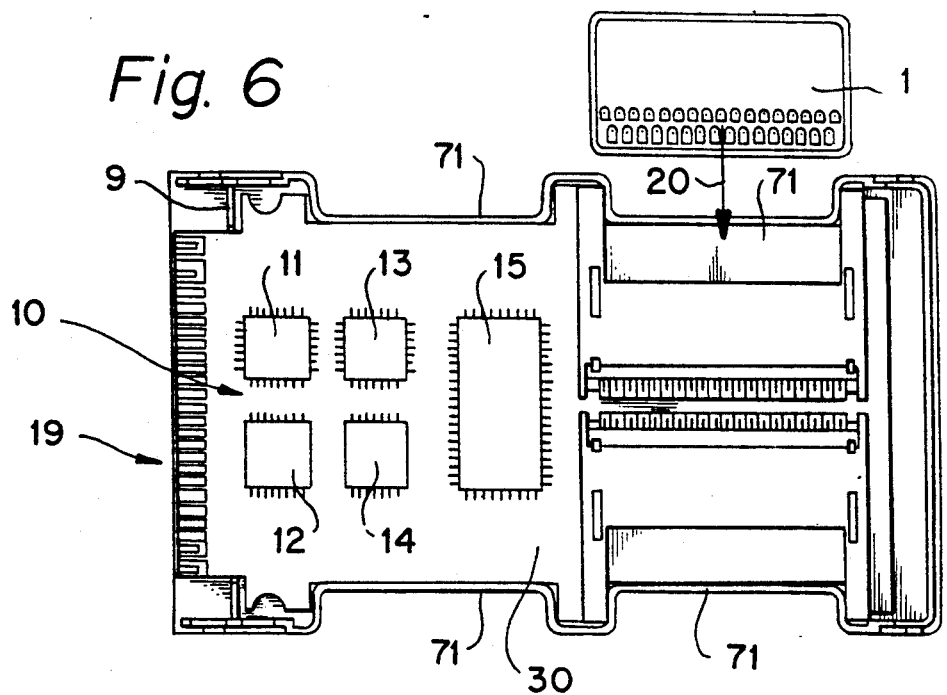
FIG. 6 is a plan view of the first embodiment of the IC card adapter with the top of the housing removed.

Turning now to FIG. 6, the first embodiment of the IC card adapter from FIGS. 2 and 3 is shown. In this arrangement of FIG. 6, the top of the housing 7 has been removed. A printed circuit board 30 within the housing 6 is schematically shown. As can be seen, various electronic devices 10 are provided on the circuit board. In particular, first, second, third, fourth and fifth electronic devices are represented by numerals 11, 12, 13, 14 and 15, respectively. By provision of these electronic devices 10, the adapter can be operated without IC cards. In other words, when the IC card 1 is not inserted into slot 71, the electronic device 3 connected by connector portion 4 to the adapter can be operated by these electronic mechanisms 11-15.

In FIGS. 7-10, a third embodiment of the IC card adapter is shown. The housing 7' of this embodiment is different from that of the first two embodiments in that three slots 24, 25 and 26 are provided. This IC card adapter of the third embodiment is similar to the first embodiment in that it is a lateral type IC card adapter. In the arrangement shown in FIG. 7, the top of the housing 7" has been removed. In this manner, the various electronic mechanisms 11, 12, 13 and 14 are shown.

It should be recognized that electronic mechanism 15 could also be used in this embodiment. In fact, fewer or more electronic mechanisms or any combination thereof can be used. Further, while the electronic mechanisms 10 are shown on the top of the printed circuit board, it should be understood that they can be located on the bottom of the printed circuit board or on the inside of the top or bottom of the housing 7, 7' or 7" of any of the embodiments of the present invention. While the second embodiment has not been shown with these electronic mechanisms 10, it should be recognized that this embodiment can also have these mechanisms.

These electronic mechanisms 11-15 can be memory chips, a CPU, custom design chips, gate arrays, etc. These electronic mechanisms 10 will merely provide an enhanced communication between the IC cards fitted to the IC card adapter and the electronic device. As explained above, these electronic mechanisms can also allow the instant IC card adapter to be operated without the individual IC cards.

Figure 7:
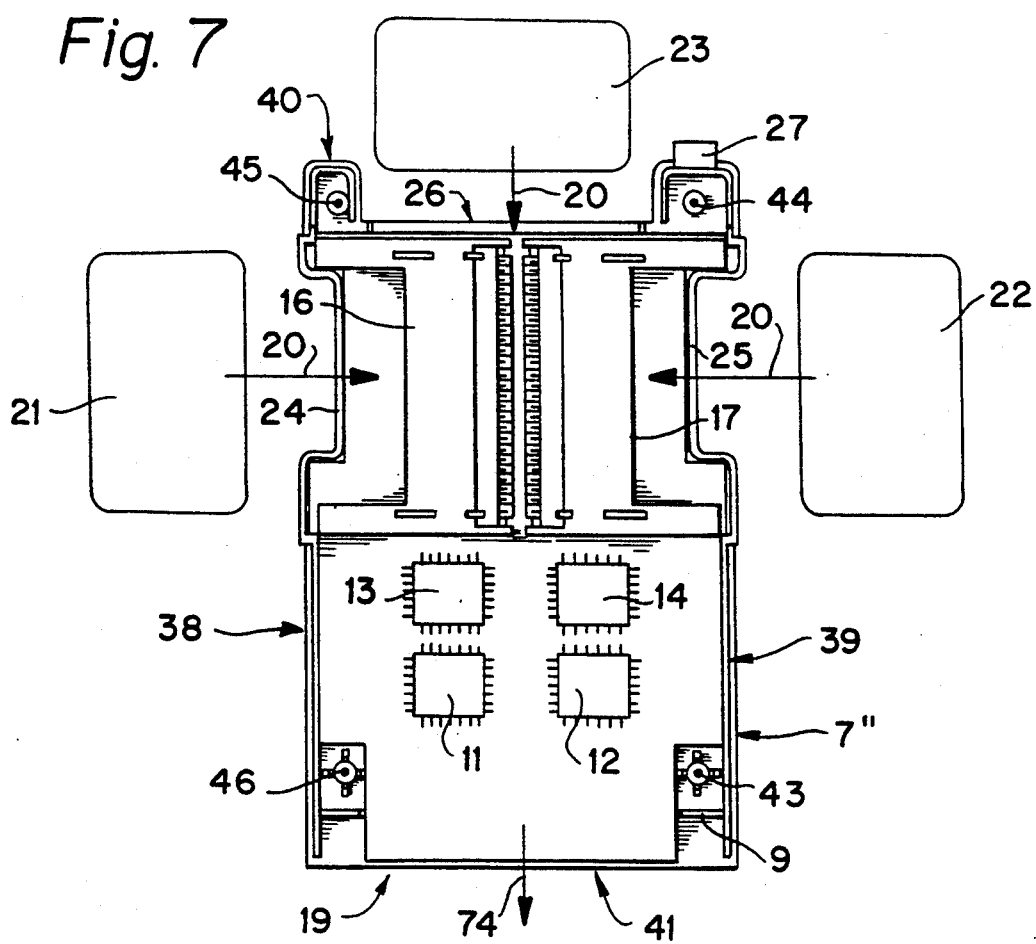
FIG. 7 is a plan view of a third embodiment of the IC card adapter of the present invention with the top of the housing removed.

FIG. 7 also shows connection posts 43, 44, 45 and 46 within the housing. Similar posts are provided on the top of the housing such that the bottom and top portions of the housing may be connected together. Of course, various connection devices or a single unitary structure can be used for the bottom and top halves of the housing 7". Similar connecting devices can also be used in housings 7 and 7'.

In FIG. 7, the card receptors 16 and 17 are shown for the third and second IC cards 21, 22, respectively. The card receptor portion for the first IC card 23 is not shown but will be described in detail below. These card receptor portions 16 and 17 are provided within slots 24 and 25 of the housing. A slot 26 is also provided for the card receptor portion for the first IC card 23.

Similar to the first embodiment, the third embodiment of FIG. 7 has a connector portion 4 which is inserted in the direction of arrow 74 to electrically and mechanically connect the adapter with an electronic device. The connector portion extends through a front wall 9 of the housing in which a recess 8 is formed. This recess 8 and front wall 9 are better shown in FIG. 10.

Figure 8:
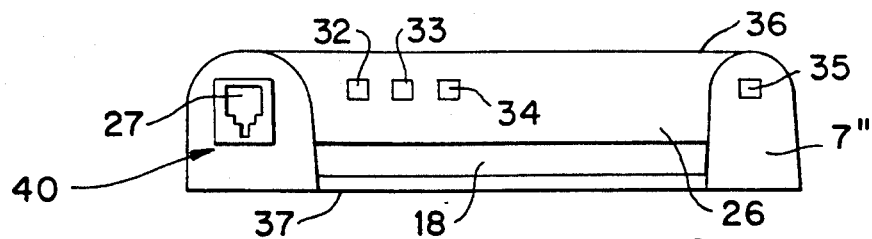
FIG. 8 is a rear side view of the third embodiment of the IC card adapter.
Figure 9:
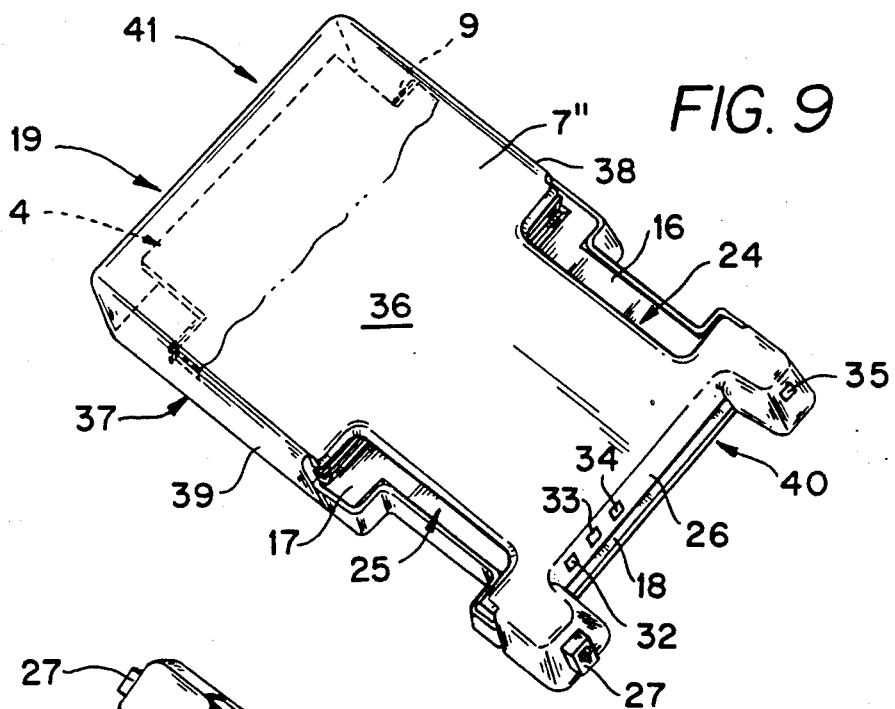
FIG. 9 is a rear perspective view of the third embodiment of the IC card adapter.
Figure 10:
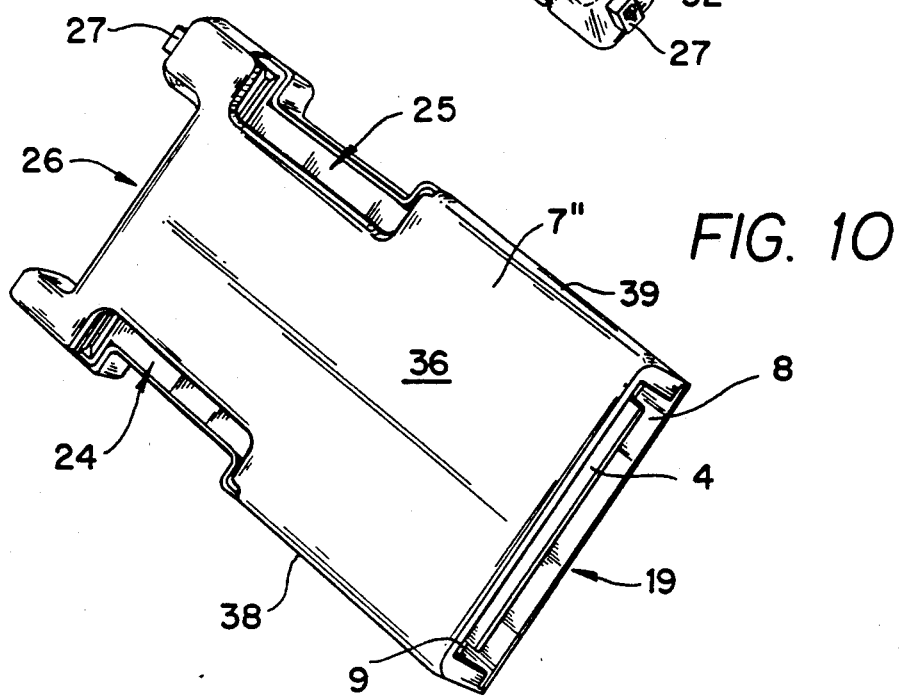
FIG. 10 is a front perspective view of the third embodiment of the IC card adapter.

As shown in FIGS. 8-10, the housing 7" of the instant invention has a top 36, bottom 37, first side 40, second side 39, third side 38 and fourth side 41. This fourth side 41 corresponds to the front portion 19 of the housing 7". The connector portion 4 extends within the recess 8 at the fourth side 41 of the housing 7". At the first side 40 of the housing is the slot 26 for the first IC card 23. On the two opposed sides 30 and 39 are the slots 24 and 2 for the second and third IC cards 21 and 22, respectively.

As seen in FIG. 8, the first side 40 of the housing 7" has the slot 26 for the first IC card 21. This slot 26 is provided between the two extending sides of the housing 7". Slot 26 has the card receptor portion 18 for the first IC card 23. Similar to the card receptor portions 16 and 17, a guide is provided to receive the first IC card 23 in this card receptor portion 18. Located above the card receptor portion 18 in slot 26 are three indicators 32, 33 and 34. A fourth indicator 35 is also provided on the first side 40 of the housing. The indicators 32, 33, 34 and 35 may be a switch and/or indicator lights such as an LED or a display.

Opposite the third indicator 35, a means for connecting the adapter to a communication device connector 27 is provided. In this manner, the IC card adapter can be connected to a phone, telephone line or other communication device. This means or connector 27 serves as a plug such that further communication devices or networks can be connected to the electronic device (such as the computer or printer) to which the IC card adapter is mechanically and electrically connected. While this means or connector 27 is shown on the rear side of the housing 7", it should be understood that it can be located in any acceptable portion of the housing 7". Moreover, such a phone connector 27 could be provided in the first or second embodiments of the instant IC card adapter.

As seen in FIG. 9, the two card receptor portions 16 and 17 are located further from the bottom 37 of the housing 7" than the card receptor portion 18. Also, the two card receptor portions 16 and 17 are generally parallel to one another and are located in the same plane while the other card receptor portion 18 is located in a different plane. The card receptor portion 18 and slot 26 are larger than the card receptor portions 16 and 17 and slots 24, 25. In this manner, larger IC cards are inserted into the card receptor portion 18. The card receptor portions 16 and 17 are generally the same size such that IC cards can be exchanged between these two portions.

When individual IC cards are located in the card receptor portions 16, 17 and 18, the two IC cards in the card receptor portions 16 and 17 will overlie the individual IC card in the card receptor portion 18. It should be recognized that the instant IC card adapter can be used with a single IC card, two IC cards or three IC cards loaded in any combination of the card receptor portions 16, 17 and 18. Further, if any of the electronic mechanisms 10 are provided in the IC card adapter, this adapter can also be operated without the use of any IC cards or with some combination of IC cards and these electronic mechanisms 10.

As mentioned above, according to the present invention, by mounting on the electronic device, with the present IC card adapter mounted thereon, it is possible to easily exchange an IC card to be incorporated in the electronic device, to thereby change a program of the latter according to demand.

Further, since it is possible to arrange a plurality of different IC cards, it is possible to increase or replace the CPU(s), ROM(s) and/or RAM(s), resulting in a multi-function electronic device. Further, it may be possible to incorporate more than one IC card in the electronic device, simultaneously.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An IC card adapter connectable to an electronic device, said adapter comprising a housing having a top, a bottom and four sides, three of the sides of the housing having slots defined therein, each slot having a card receptor portion for receiving an individual IC card, at least one of the car receptor portions being in a first plane which is noncoincident and generally parallel to a second plane in which at least one other card receptor portion is located, IC cards being readily detachable from the card receptor portion.

2. The IC card adapter as recited in claim 1, further comprising a connector portion located at a side of the housing without a slot, the connector portion electrically and mechanically connecting the adapter to an electronic device.

3. The IC card adapter as recited in claim 2, wherein a first side of the housing has a first slot, a second side of the housing has a second slot, a third side of the housing has a third slot and a fourth side of the housing has the connector portion, the first and fourth sides of the housing being opposed to one another and the second and third sides of the housing being opposed to one another, a first, second and third card receptor portion being located in the first, second and third slots, respectively.

4. The IC card adapter as recited in claim 3, wherein the first, second and third card receptor portions are generally parallel to one another, the second and third card receptor portions being located in generally the first plane while the first card receptor portion is located in the second plane.

5. The IC card adapter as recited in claim 3, wherein the card receptor portions in the second and third slots are located further from the bottom of the housing than the card receptor portion in the first slot.

6. The IC card adapter as recited in claim 3, wherein the first card receptor portion and first slot are larger than the second and third card receptor portions and slots whereby the card receptor portion in the first slot receives individual IC cards which are larger than individual IC cards received in the card receptor portions in the second and third slots.

7. The IC card adapter as recited in claim 6, wherein the second and third card receptor portions and slots generally have the same size whereby individual IC cards can be readily interchanged between the card receptor portions in the second and third slots.

8. The IC card adapter as recited in claim 3, further comprising a plurality of indicators located on the first side of the housing.

9. The IC card adapter as recited in claim 3, further comprising a phone connector located on the first side of the housing for connecting the adapter to one of a telephone and a telephone line.

10. The IC card adapter as recited in claim 2, further comprising a printed circuit board with circuitry located within the housing and connectable to the electronic device through the connector portion such that the adapter can be operated without individual IC cards.

11. The IC card adapter as recited in claim 1, wherein two of the card receptor portions are in slots on opposed sides of the housing and are generally in the first plane with a third card receptor portion being located in the second plane.

12. The IC card adapter as recited in claim 1, wherein two of the card receptor portions are in slots on opposed sides of the housing and are at a different distance from the bottom of the housing than the third card receptor portion.

13. The IC card adapter as recited in claim wherein two of the slots and card receptor portions are a different size than the other slot and card receptor portion wherein the two card receptor portions receive individual IC cards having a different size than the other card receptor portions.

14. The IC card adapter as recited in claim 1, further comprising a phone connector mounted on the housing.

15. The IC card adapter as recited in claim 14, wherein the phone connector connects the adapter to at least one of a telephone, a telephone line, a computer and a printer, the phone connector being located on one of the sides of the housing.

16. The IC card adapter as recited in claim 15, further comprising a connector portion located at a side of the housing without a slot, the side of the housing having the phone connector being generally parallel to the side of the housing with the connector portion.

17. The IC card adapter as recited in claim 15, wherein the side of the housing having the phone connector has one of the slots defined therein, the phone connector being spaced from the one of the slots.

18. The IC card adapter as recited in claim 1, further comprising means for connecting the adapter to a communication device, the means for connecting being located on the housing.

19. The IC card adapter as recited in claim 18, wherein the means for connecting comprises a phone connector for connecting the adapter to at least one of a telephone, a telephone line, a computer and a printer.

20. An IC card adapter connectable to an electronic device, said adapter having a housing and at least two card receptor portions for receiving individual IC cards, a first one of the card receptor portions being located in a first slot defined in the housing and a second one of the card receptor portions being located in a second slot defined in the housing, the first slot and card receptor portion being larger than the second slot and card receptor portion whereby the first card receptor portion receives IC cards which are larger than IC cards received by the second card receptor portion, the first and second card receptor portions each being in generally parallel, noncoincident planes.

21. The IC card adapter as recited in claim 20, wherein the first and second slots are located in a first and a second side, respectively, of the housing, the first and second sides of the housing being generally perpendicular to one another.

22. The IC card adapter as recited in claim 21, further comprising a third slot with a third card receptor portion, the third slot being defined in a side of the housing which is generally perpendicular to the first side and generally parallel to the second side.

23. The IC card adapter as recited in claim 22, wherein the third slot and card receptor portion are generally the same size as the second slot and card receptor portion whereby individual IC cards can be readily exchanged between the second and third card receptor portions.

24. The IC card adapter as recited in claim 22, wherein the second and third card receptor portions are generally located in the same plane and the first card receptor portion is located in another plane.

25. The IC card adapter as recited in claim 24, further comprising a phone connector mounted on the housing.

26. The IC card adapter as recited in claim 20, wherein the first and second card receptor portions are located in different planes.

27. The IC card adapter as recited in claim 20, further comprising a phone connector mounted on the housing.

28. The IC card adapter as recited in claim 27, wherein the phone connector connects the adapter to at least one of a telephone, a telephone line, a computer and a printer, the phone connector being located on one of the sides of the housing.

29. The IC card adapter as recited in claim 20, further comprising means for connecting the adapter to a communication device, the means for connecting being located on the housing.

30. The IC card adapter as recited in claim 29, wherein the means for connecting comprises a phone connector for connecting the adapter to at least one of a telephone, a telephone line, a computer and a printer.

* * * * *